United States Patent Office 2,963,565
Patented Dec. 6, 1960

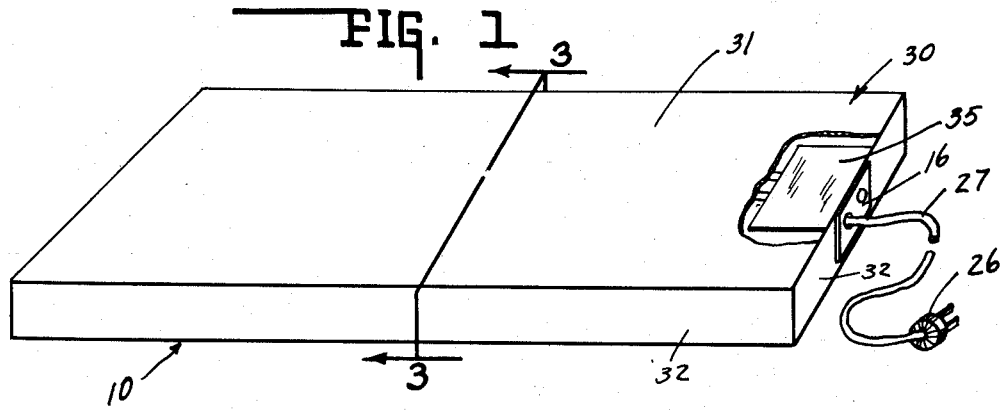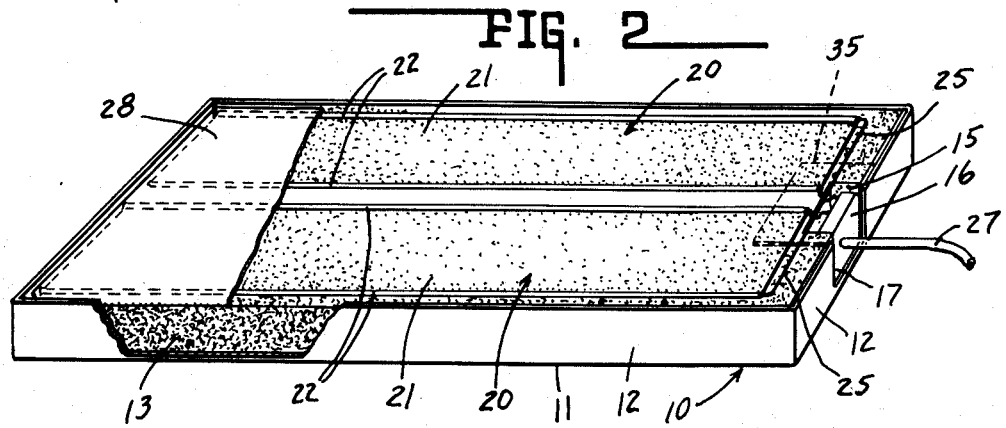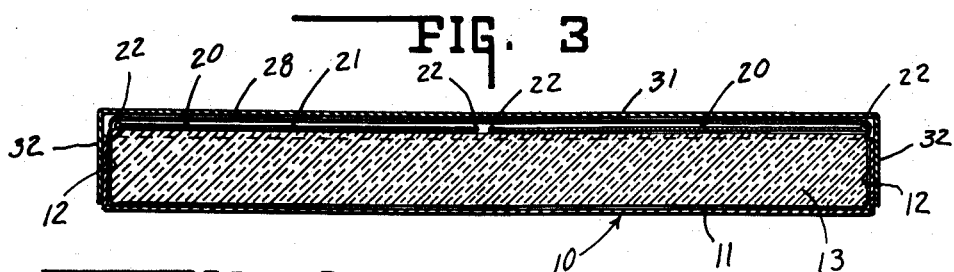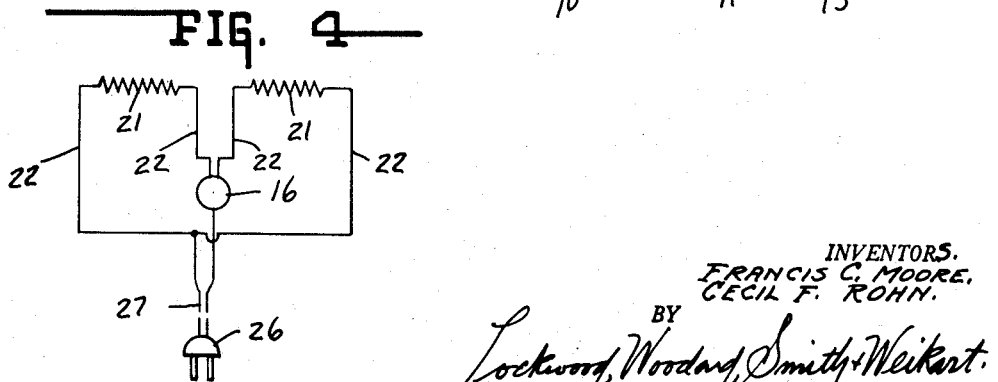

2,963,565
HEATER FOR ANIMAL PENS
Francis C. Moore and Cecil F. Rohn, Indianapolis, Ind., assignors to Press Pallet Inc., Indianapolis, Ind., a corporation
Filed June 1, 1959, Ser. No. 817,182
1 Claim. (Cl. 219—19)

The present invention relates to a heater for animal pens and may find its primary utility in a barn or other building for warming young animals such, for example, as pigs, lambs, and the like.

One presently available device for warming small animals is a radiant heat lamp. Because of the high operating temperature of such lamps, and the large amounts of straw and other cumbustible material in barns and in other buildings used for housing animals in cold weather, such heat lamps are dangerous and frequently cause fires and loss of the animals. Another type of heater which is often used comprises a container filled with water which is warmed by an electrical heating unit. The latter type of heating device is relatively expensive and there is some danger of electrocution of the animals heated thereby. Also, leakage causes dampness which is injurious to young animals. Both of the above types of heating units waste heat because only a small amount of the heat produced thereby is delivered to the animals.

It is an object of the present invention to provide an improved heating device for animals and animal pens.

A further object of the present invention is to provide a heating device for animal pens which operates at relatively low temperatures, is inexpensive, safe and does not waste heat.

Still further objects of the present invention will become apparent from the following description.

The full nature of the invention will be understood from the accompanying drawings and the following description and claim:

Fig. 1 is a perspective view of a heating device embodying the present invention.

Fig. 2 is a perspective view similar to Fig. 1 showing the device with the cover thereof and with a dielectric sheet thereof removed.

Fig. 3 is a vertical section taken along the plane 3—3 of Fig. 1 in the direction of the arrows.

Fig. 4 is a schematic view of a possible electric circuit of the present device.

Referring now to the drawings, I have illustrated my invention as comprising a sheet steel container or pan indicated generally by the numeral 10 (Fig. 2) and having a rectangular bottom 11 and four rectangular sides 12—12 which extend perpendicularly a relatively short distance from the bottom 11 as compared to the lengths of the sides so as to form a relatively shallow container.

A flat rectangular block 13 of heat insulating material such, for example, as polystyrene is received within the container 10 and substantially fills the container. The block 13 has a recess 15 for reception of a conventional thermostatic switch 16 which is fixed by means of a bracket 17 to one side of the container in such a manner as to extend into the recess 15.

Heating pads or elements comprising two sheets 20—20 of fiberglass or other electrically insulative material, which have a thickness and woven structure approximately the same as heavy canvas, are supported upon the block of polystyrene in spaced relation to the container 10 and to one another, and substantially cover the upper surface of the block of polystyrene. Each of the sheets of fiberglass has on its upper face a coating 21 of carbonaceous, electrically conductive paint. Secured to each of the sheets of fiberglass adjacent the opposite edges thereof are a pair of bare electrical conductors 22—22 which electrically contact the coating of conductive paint all along the opposite sides of the layers of fiberglass. The electrically conductive coating 21 provides a resistance element connected between conductors 22—22 which produces heat when electrical current passes therethrough. Even though the conductive coating 21 becomes cracked during use of the heater, it will still provide an effective heating element because of the fact that there will always be a multiplicity of conductive paths between the conductors 22 and these conductors are in contact with the coating all along the length of the opposite sides of the fiberglass sheets.

The electrical conductors 22 are insulated at their portions 25—25 and may be connected to a source of electrical potential by a conventional wall plug 26. Referring to Fig. 4, a possible electrical circuit of the device is illustrated. One of the conductors of each pair of conductors 22 is electrically connected in series to the thermostat 16, to one conductor of a conventional twin conductor electrical cord 27 and to the wall plug 26. The other conductor of each pair of conductors 22 is electrically connected in series to the other conductor of the electrical cord 27 and to the wall plug 26.

A sheet 28 of dielectric material overlies and covers the upwardly facing surfaces of the fiberglass sheets 20 and the block of polystyrene 13 and, if desired, may be tucked beneath the edges of the layers of fiberglass 20. A cover 30 of sheet steel has a rectangular central portion 31 and four rectangular sides 32 extending perpendicularly from the central portion a relatively short distance as compared to the length of the sides. The cover 30 is received upon the container 10 with its sides overlying the sides of the container and fixed thereto. A rectangular piece of aluminum foil 35 covers the recess 15 and is received between the dielectric material 28 and the cover 31 so as to conduct the heat of the cover into the recess 15 so that the thermostat 16 can control the heat of the cover.

Because of the fact that the polystyrene block 13 and the sheets of fiberglass material 20 are poor conductors of heat, practically all of the heat produced in the electrically conductive coating 21 will be transferred through the sheet of dielectric material 28 to the sheet metal cover 30 and to the pigs or other animals which are lying thereon. It is found that cover 30 may be heated to a temperature of approximately 90° F. and provide adequate heat for warming young animals. Thus it can be seen that relatively little of the heat produced by the present heating device is wasted. Also, this invention provides heating apparatus which at no time operates at temperatures high enough to support combustion. The heat of the cover is transferred through the aluminum foil 35 to the recess 15 where it is sensed by thermostat 16 which then controls the current through the conductive coatings 20.

While the invention has been disclosed and described in some detail in the drawings and the foregoing description, they are to be considered as illustrative and not restrictive in character, as other modifications may readily suggest themselves to persons skilled in this art and within the broad scope of the invention, reference being had to the appended claim.

The invention claimed is:

A heating device comprising a sheet metal container having a rectangular bottom and four rectangular sides extending perpendicularly from said bottom, said sides extending a relatively short distance from said bottom as compared to the length of said sides so as to form a relatively flat container, a flat rectangular block of polystyrene substantially filling said container, said block having a recess in its edge, a thermostat mounted upon one side of said container and projecting into said recess, two rectangular sheets of fiberglass spaced from one another and from said container and covering substantially the complete upper surface of said polystyrene block, a coating of electrically conductive paint covering the upper surface of each of said sheets of fiberglass, a pair of spaced conductors secured to each of said sheets of fiberglass at opposite edges thereof and in contact with the conductive coating on each sheet of fiberglass, said conductors adapted to be connected to a source of electrical potential through said thermostat, a sheet metal cover for said container having a rectangular central portion and four rectangular sides extending perpendicularly from said central portion, said sides of said cover extending a relatively short distance from said central portion as compared to the length of said sides, said sides of said cover overlying said sides of said container and fixed thereto, a sheet of dielectric material received between said cover and said sheets of fiberglass and electrically insulating said conductive coatings from said cover, and a rectangular sheet of aluminum foil received between said cover and said block and overlying said recess for conducting heat from said cover to said recess.

References Cited in the file of this patent

UNITED STATES PATENTS

| | | |
|---|---|---|
| 1,718,412 | Crooker et al. | June 25, 1929 |
| 2,106,756 | Obermaier | Feb. 1, 1938 |
| 2,280,779 | Barragy | Apr. 28, 1942 |
| 2,404,736 | Marick | July 23, 1946 |
| 2,513,733 | Morris | July 4, 1950 |
| 2,559,077 | Johnson et al. | July 3, 1951 |
| 2,842,651 | Neely | July 8, 1958 |
| 2,866,066 | Neely | Dec. 23, 1958 |